Figure 2:
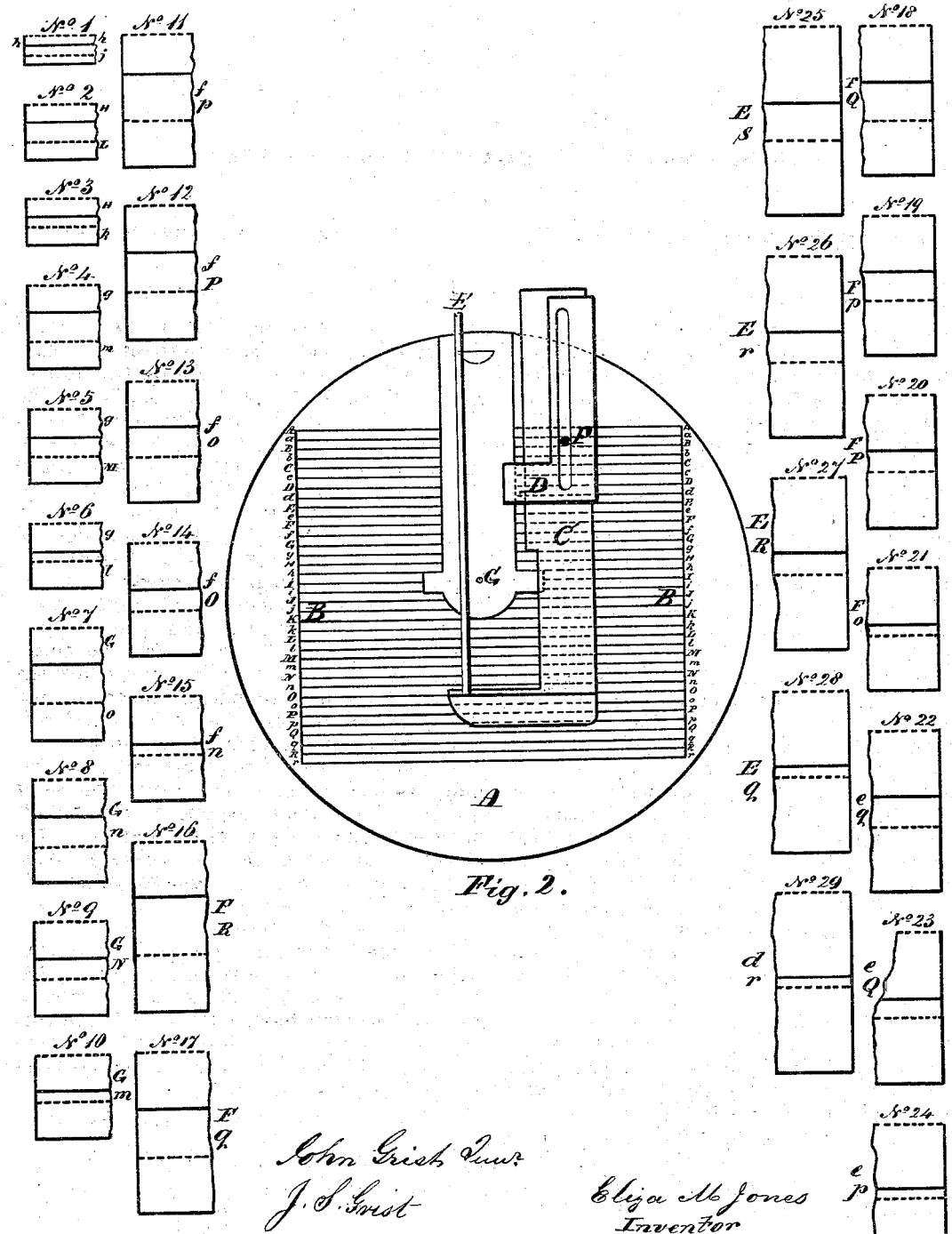

ELIZA M. JONES.
Tuck-Creasing Devices.

No. 154,052. Patented Aug. 11, 1874.

UNITED STATES PATENT OFFICE.

ELIZA MARIA JONES, OF BROCKVILLE, CANADA.

IMPROVEMENT IN TUCK-CREASING DEVICES.

Specification forming part of Letters Patent No. 154,052, dated August 11, 1874; application filed May 14, 1874.

*To all whom it may concern:*

Be it known that I, ELIZA MARIA JONES, (wife of Chilion Jones,) of Brockville, in the county of Leeds, in the Province of Ontario, Canada, have invented a new and useful Improvement in Tuck-Creasing Devices or Apparatus; and I do hereby declare that the following is a full, clear, and exact description of the same.

This invention consists in the combination of a sewing-gage and a spacing-gage or marker, adjustable independently in relation to the needle, and employed in connection with the scale on the cloth-plate, as hereinafter described.

Figures 1 to 29 represent a chart, showing the widths of a series of tucks and folds. Fig. 2 is a top view of the cloth-plate of a sewing-machine, showing the engraved scale thereon and tucker adjusted.

A is the cloth-plate of a sewing-machine. Engraved, marked, or delineated thereon, or affixed thereto, is a scale, B, suitably figured or lettered. The lines of the scale may be more or less close, but equally distant. C is the tucker-plate; D, the gage, and E the marker of the tucking device, which is secured to the plate A by a screw, F, in the usual manner. G is the needle-hole in the cloth-plate.

The tuck delineations or patterns in the chart are lettered or figured, or both, to correspond to the scale on the cloth-plate, and the widths of the folds and tucks are relatively equal to the divisions of the scale.

To use the devices, the width of tuck to be made is selected on the chart, say No. 9, which is shown as a tuck of four-line width of the scale divisions, a blank of two lines, and a fold for the succeeding tuck of the width of the preceding tuck. This figure on the chart is lettered G and N, to indicate the adjustment position of the gage and marker of the tucker. The gage is adjusted to the line G, and the marker to the line N, of the scale on the cloth-plate. This relative adjustment of the gage and marker will produce the width of tuck shown in Fig. 9 of the chart. In like manner, if No. 24 is chosen as the width of tuck desired, that figure, being lettered *e p*, indicates that the gage and marker must be set to the lines so marked on the cloth-plate.

By the use of my chart and scale an operator, after removing the tucker from the cloth-plate, can, after replacing the same, adjust the gage and marker to indicate positions, and thus produce the same width of tuck and fold, if desired, in continuation of the work.

Without the use of my chart and scale this uniform combination of the work at the same width of tuck would require a trial adjustment of the gage and marker; and one of the objects of my invention is to facilitate the adjustment of the gage and marker to an indicated position of adjustment.

I claim as my invention—

The gage D and spacing-gage or marker E, adjustable independently in relation to the needle of a sewing-machine, and combined with a cloth-plate having the scale B thereon, for determining the positions of the respective gages for tucks and spaces, substantially as herein shown and described.

ELIZA MARIA JONES.

Witnesses:
  A. G. HERVEY,
  C. SWEENY.